United States Patent [19]

Potter et al.

[11] Patent Number: 4,587,110

[45] Date of Patent: May 6, 1986

[54] PROCESS OF RECOVERING COPPER AND OF OPTIONALLY RECOVERING SILVER AND GOLD BY A LEACHING OF OXIDE- AND SULFIDE-CONTAINING MATERIALS WITH WATER-SOLUBLE CYANIDES

[75] Inventors: George M. Potter, Tucson, Ariz.; Arthur Bergmann; Ulrich Haidlen, both of Lennestadt, Fed. Rep. of Germany

[73] Assignee: MNR Reprossesing, Inc., Toronto, Canada

[21] Appl. No.: 639,370

[22] Filed: Aug. 8, 1984

[30] Foreign Application Priority Data

Aug. 26, 1983 [DE] Fed. Rep. of Germany ....... 3330795

[51] Int. Cl.⁴ ................................................ C01G 3/12
[52] U.S. Cl. ........................................ 423/30; 423/37; 423/42; 423/372; 423/379; 423/383; 75/106; 75/108; 75/117; 75/118 R
[58] Field of Search .................. 423/29, 383, 30, 372, 423/31, 379; 75/118 R, 117, 105, 106, 108

[56] References Cited

U.S. PATENT DOCUMENTS 3,189,435 6/1965 Lower .................................. 423/29
3,403,020 9/1968 Lower .................................. 423/29
4,188,208 2/1980 Guay .................................... 423/29

Primary Examiner—John Doll
Assistant Examiner—Robert L. Stoll
Attorney, Agent, or Firm—Felfe & Lynch

[57] ABSTRACT

A process is described by which copper and optionally silver and gold are recovered from sulfide and oxide ores, concentrates or slag, which contain the metals. The particulate materials are treated with an aqueous solution of an alkali cyanide or alkaline earth cyanide, the laden solution is filtered, if desired, a water-soluble sulfide compound is added to the laden solution or filtered laden solution, the laden solution is subsequently adjusted to a pH value below 5 by an addition of acid to precipitate the metal sulfide, which is filtered off, and the resulting hydrocyanic acid is recovered. The process steps of precipitation and filtration of the metal sulfide and the recovery of the free hydrocyanic acid contained in the filtrate are carried out under superatmospheric pressure of 1.5 to 15 bars. The precipitation is preferably effected at a pH value of 1.5 to 2.0. The free hydrocyanic acid is recovered as alkali cyanide or alkaline earth cyanide and is recirculated to the leaching stage.

8 Claims, 2 Drawing Figures

PROCESS OF RECOVERING COPPER AND OF OPTIONALLY RECOVERING SILVER AND GOLD BY A LEACHING OF OXIDE- AND SULFIDE-CONTAINING MATERIALS WITH WATER-SOLUBLE CYANIDES

BACKGROUND OF THE INVENTION

This invention is in a process for recovery of copper and the optional recovery of silver and gold from sulfide- and oxide-containing materials, which contain said metals, and are leached with water-soluble cyanides.

It is known from British Patent Specification No. 1,050,303 that sulfide copper ores, such as chalcocite ($Cu_2S$) or oxide copper ores, such as malachite ($Cu_2(OH)_2CO_3$) or azurite ($CuCO_3.Cu(OH)_2$) in an aqueous dispersion can be treated under alkaline conditions with water-soluble cyanides, such as sodium cyanide, whereafter the copper is complex form, e.g., as sodium-copper cyanide ($Na_2Cu(CN)_3$) can be dissolved out of the solids. Water-soluble sulfide compounds, such as sulfides or hydrogen sulfides of alkalies or alkaline earths, are added to the cyanide solutions which have been removed from the solids. The metal sulfide, such as copper sulfide and silver sulfide, is quickly precipitated after the pH value has been adjusted to below 5 by the addition of sulfuric acid. The precipitate is filtered off and the free hydrocyanic acid is recovered from the filtrate by introducing a stream of gas, such as air or steam, into the filtrate to strip the acid. The acid vapor is either condensed or introduced into alkaline solutions and is re-used. This process is generally carried out at ambient temperatures and under atmospheric pressure. With the exception of the recovery of hydrocyanic acid, the process can allegedly also be carried out under superatmospheric pressure although this is not very economical.

In the known process, the hydrocyanic acid must be stripped by means of gas streams at high flow rates and in a second step must be converted to alkali cyanide for re-use. Such a process is very expensive regarding capital investment and operating costs.

SUMMARY OF THE INVENTION

It is an object of the invention to provide for an economical processing of the aqueous filtrates which contain combined cyanogen and which become available in the leaching of raw materials and other materials which contain copper and possibly contain noble metals with cyanide solutions and for an integration of said processing in the leaching process. Additionally, the recovery from the laden cyanide solution of any precious metals, i.e., gold and silver, which accompany the copper in the raw materials, is facilitated or improved.

This object is accomplished in that a process of the kind described above is carried out, in accordance with the invention, whereby the precipitation of the metal sulfide, the filtration to separate the metal sulfide, and the recovery of the free hydrocyanic acid contained in the filtrate are carried out under superatmospheric pressure.

The above-mentioned process steps are suitably carried out under a pressure of 1.5 to 15 bars. It has been found that a pressure in the range of 1.5 to 4 bars is particularly desirable for that purpose. The temperature is maintained substantially at the ambient temperature, with seasonal variations in carrying out the process steps.

The precipitant consists of a sulfide or hydrogen sulfide of an alkali or alkaline earth. A sulfide or hydrogen sulfide of an alkali metal, preferably sodium hydrogen sulfide, can be used to advantage.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

DESCRIPTION OF PREFERRED EMBODIMENT

Figure 1:
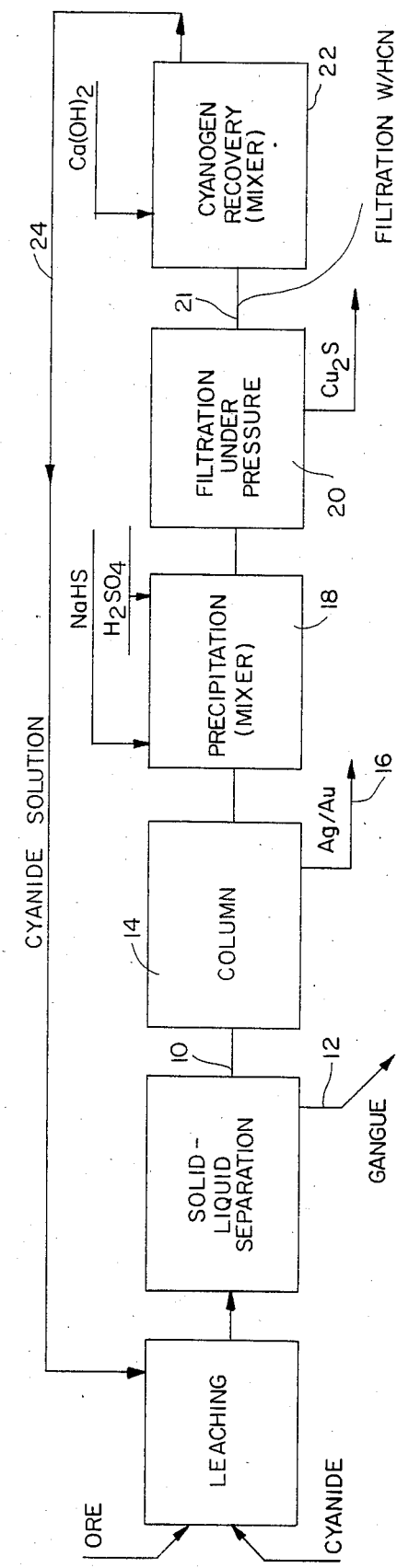
FIG. 1 is a flow diagram depicting the process of the invention.

Referring to FIG. 1, a laden cyanide solution 10, from which gangue 12 has been separated and which contains copper and possibly silver and gold, is passed through a column 14, which contains an adsorbent, such as activated carbon, and in which silver and gold 16 are removed from the copper cyanide solution by adsorption. Alternatively, other known recovery methods such as ion exchange resin adsorption, solvent extraction, Merrill-Crowe zinc dust precipitation and others may be applied. The cyanide laden solution is then thoroughly mixed with the water-soluble sulfide precipitant under superatmospheric pressure. Alternatively, the sulfide may be mixed with the feed solution in a storage tank (not shown) prior to entering the pressurized system. That thorough mixing is desirably effected by means of high-intensity mixers 18 or liquid stirrers, such as in-line mixers having internal fixtures consisting of, e.g., fixed baffles or rotatable helices. In accordance with the invention the aqueous solution of the precipitant, NaHS, is fed to mixer 18 under pressure adjacent to the inlet for the laden cyanide solution. Alternatively, the premixed sulfide-containing solution is fed to mixer 18 under pressure. The pH is adjusted to between 1 and 3 by the addition of acid such as $H_2SO_4$, under pressure, adjacent to the outlet for the reaction medium. A thorough mixing is quickly achieved and copper sulfide is precipitated or is coprecipitated with noble metal sulfides. The precipitate is filtered off suitably by means of a filter 20 operating under superatmospheric pressure and optionally having a pre-filtering layer which may be of diatomaceous earth. The acid filtrate 21 discharged under pressure contains free hydrocyanic acid.

The quantity of the free hydrocyanic acid which can be recovered will depend on a number of factors. Any divalent iron contained in the laden cyanide solution is present as the iron cyanogen complex $[Fe(CN)_6]^{4-}$, which is virtually indestructible. If the precipitant is used in excess, stable thiocyanates (rhodanides) will be formed. Since the cyanogen contained in either of the complex or thiocyanates cannot be recovered, it is desirable to subject the ore or other raw material to an oxidizing treatment before the leaching process and to avoid a surplus of the precipitant, if possible.

The filtrate obtained by the filtration of the precipitated metal sulfide contains free hydrocyanic acid and is reacted under an atmospheric or superatmospheric pressure with an aqueous solution or suspension of an alkaline substance, such as an oxide, hydroxide or carbonate of an alkali metal or alkaline earth metal. For this reaction step the liquids are preferably mixed in an in-line mixer 22. The preferred superatmospheric pressure in the in-line mixer and the high turbulence therein will promote the reaction. Milk of lime, $Ca(OH)_2$, is desirably supplied under superatmospheric pressure into the mixing tube 22, wherein the free hydrocyanic acid is converted to its water-soluble calcium salt $Ca(CN)_2$. The treated solution having a pH value above 8, and suitably above 10, is discharged from the in-line mixer through a suitable throttling valve (not shown). Any solids, such as calcium sulfate, which remain in the calcium cyanide solution are separated before the solution is recycled.

In the process according to the invention the precipitation of metal sulfides, the separation of the precipitated metal sulfides and the recovery of the hydrocyanic acid are effected in the enclosed process and the recovered hydrocyanic acid leaves the enclosed apparatus in the form of soluble cyanides of alkali metals or alkaline earth metals in an effluent having a pH value which is sufficiently high to ensure that the environment will not be polluted by free hydrocyanic acid.

The process according to the invention can be used to advantage to treat also copper-containing raw materials which contain noble metals, such as silver and gold. For instance, silver and gold can be jointly recovered from the copper cyanide solution if the raw solution, which has been clarified and from which solids have been separated, is treated with activated carbon, on which gold and silver present as the complexes $[Au(CN)_2]^-$ and $[Ag(CN)_2]^-$ are adsorbed so that the activated carbon can be subjected to further processing. That separation is suitably accomplished by passing the clarified laden solution through a column packed with an adsorbent, such as activated carbon. Alternatively, other known gold-silver recovery processes, such as ion exchange resin adsorption, solvent extraction, zinc dust precipitation and others may be used. Subsequent to the removal of silver and gold, the copper cyanide solution is subjected to the precipitation, filtration and cyanogen recovery treatments.

In another embodiment of the process according to the invention the gold and silver can be separately recovered. In that case the clarified copper cyanide solution which contains gold and silver is first treated for a separation of silver under alkaline conditions. For this purpose, sodium sulfide, e.g., is added to the solution, to precipitate silver sulfide, which is subsequently separated. The filtrate, which contains copper and gold, is then treated with activated carbon, on which the gold is adsorbed. For this treatment the filtrate is suitably passed through a column packed with activated carbon. Alternatively, processes mentioned in the preceding paragraph may be applied. The solution leaving the column or alternative recovery process is supplied to the precipitating stage, in which copper is precipitated under highly acidic conditions. The copper sulfide is subsequently separated. The free hydrocyanic acid contained in the filtrate recovered from the precipitated copper sulfide is combined by a reaction with oxides, hydroxides or carbonates of alkali metals or alkaline earth metals and the resulting solution is recycled to the leaching stage.

Figure 2:
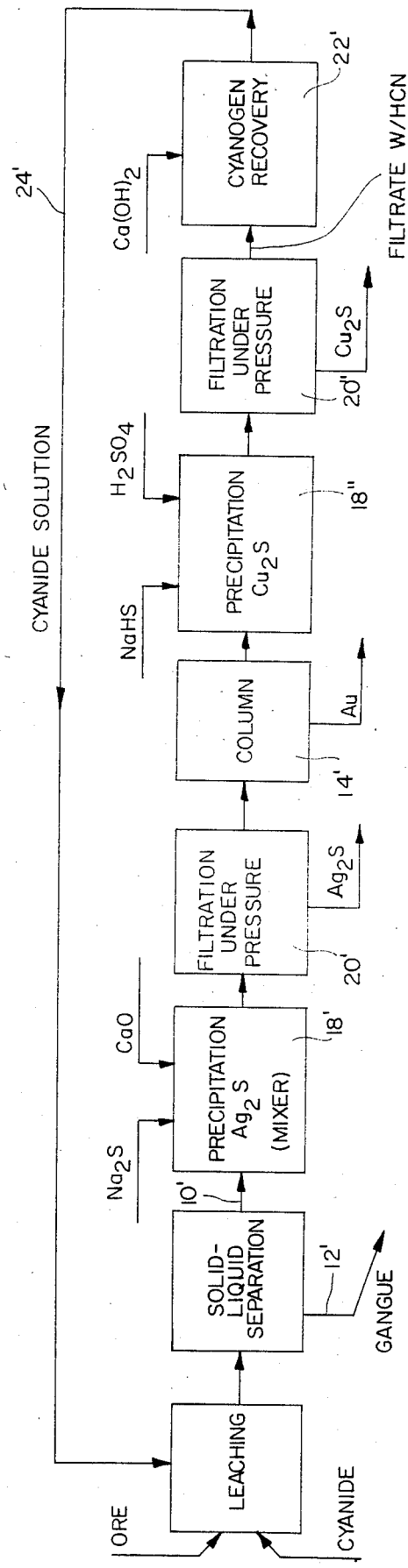
FIG. 2 is a flow diagram depicting an alternate embodiment of the invention.

In FIG. 2, the clarified copper cyanide solution 10', which contains silver and gold, is treated under alkaline conditions for precipitation 18' of silver sulfide, which is subsequently filtered off in filtration device 20'. The filtrate is passed through a column 14' which contains an adsorbent, such as activated carbon, on which gold is adsorbed. The precipitation of the copper sulfide 18'', its recovery by filtration 20'', the recovery of cyanogen 22' and the recycling 24' are carried out under superatmospheric pressure as in the first embodiment.

The materials which contain copper and may contain silver and gold may be leached with cyanides by known methods, with percolation or agitation. For a percolation the cyanide solution is continuously supplied to the top of a pile of the raw material which may be several meters high, and which generally has a relatively large particle size (ranging from about 15 mm up to about 1 meter). The solution laden with metal salts is withdrawn at the bottom. Leaching by percolation may be carried out also in vats, which usually have a filtering bottom, on which the material to be leached has been placed in a particle size typically up to about 15 mm. Owing to the smaller particle size, the leaching of treatable ores may take only 5 to 12 days in that case whereas the leaching of a pile of coarser ore may take 2 to 3 weeks or longer.

The cyanide solution obtained by percolation is advantageously virtually free of solids, and the leaching technology requires a relatively small capital investment. Ores, which are more highly disseminated, must be ground to a particle size of 0.2 mm or less. Ores having such a small particle size can be leached only with agitation unless an agglomeration procedure is practiced. In the case of agitation the leaching usually takes 10 to 70 hours and the solids and the metal cyanide-containing solution are separated by filtration.

The advantages afforded by the process according to the invention reside in that cyanogen is recovered at a high rate of more than 90% and up to 95% so that a highly economical process for a treatment of copper ore or copper-containing raw materials is provided, particularly for a treatment of carbonate copper ores. Besides, any noble metal values contained in copper ores can be dissolved out of the ores in a simple manner by a leaching with cyanides and can be recovered in an economical manner by a separation.

EXAMPLE 1

1 kg of an oxide- and carbonate-containing copper ore (malachite/azurite) which contained 0.5% Cu, 2.0 grams Au per metric ton, 50 grams Ag per metric ton was crushed to a particle size below 10 mm and was then leached for ten days with an aqueous solution of 36 g NaCN per liter in a glass tube, which was provided at its lower end with a sieve. 0.33 Liters of the solution was circulated by a pump until an increase of the copper concentration was no longer detected. This was the case after ten days. Small quantities of suspended solid ore particles were filtered off. The laden solution contained 10.5 g/l Cu, 4.8 mg/l Au, 120 mg/l Ag. In consideration of the quantities of solution and solids, this means that 70% of the copper and 80% of the noble metals were dissolved by the simulated pile leaching which has been described.

The laden solution was subsequently passed through an activated carbon filter (in a column) so that the noble metals were recovered in known manner by an adsorption on activated carbon. A portion of the dissolved copper is also adsorbed on the activated carbon but that portion will be smaller the more noble metals are adsorbed on the carbon. About 10% of the copper value and 95% of the noble metals are adsorbed on the activated carbon.

Owing to the adsorption on carbon, the metal content of the laden solution leaving the activated carbon column amounted, only to 9.45 g/l Cu, 0.24 mg/l Au and 6.00 mg/l Ag.

The laden solution was subsequently fed by a pump under superatmospheric pressure to a plant consisting of a first in-line mixer, a succeeding filter having a prefiltering layer of diatomaceous earth, and a second in-line mixer succeeding the filter. 4 g NaHS in the form of a 20% solution, which was under a pressure of 2 bars, were supplied to the first in-line mixer adjacent to its inlet for the laden solution. Adjacent to the outlet for the laden solution, the first in-line mixer was supplied with 15 grams of concentrated sulfuric acid under superatmospheric pressure to adjust the pH value to 1.8. The immediately precipitating copper sulfide was separated in the succeeding filter under superatmospheric pressure and the filtrate was supplied to the succeeding second in-line mixer. In the second in-line mixer, 150 ml milk of lime (as a 20% suspension) was added to the filtrate, which contained free hydrocyanic acid, so that a pH value of 10.5 was obtained. Small quantities of calcium sulfate were separated from the soluble calcium cyanide thus formed. The calcium cyanide was then put to further use.

The filter cakes obtained by the filtration of the metal sulfides contained 10 grams diatomaceous earth and 3.9 grams of a copper-containing precipitate, which contained 74% Cu, 20% S and small quantities of Ag and Au. The filtrate separated from the precipitated metal sulfides had a pH value of 10.5 and contained 62.5 mg/l Cu, about 0.01 mg/l Au, 0.3 mg/l Ag and 11.5 g/l CN. The filtrate amounted to 0.5 liter.

EXAMPLE 2

1 kg of oxide and carbonate-containing copper ore (malachite/azurite) containing
0.5% Cu. 2.0 grams Au per metric ton,
50 grams Ag per metric ton
was leached as described in Example 1.

The laden solution contained 10.5 g/l Cu, 4.8 g Au per metric ton and 120 mg/l Ag. To separate the silver, 0.08 gram CaO—corresponding to 250 grams CaO per metric ton of solution—and 0.034 gram $Na_2S$—corresponding to 0.87 grams of $Na_2S$ per gram of Ag, were added to the solution, which was then stirred for one hour to precipitate the silver. The treated solution was filtered under superatmospheric pressure in a filter having a prefiltering layer of diatomaceous earth. The filter cake contained 10 grams diatomaceous earth and lime as well as 0.05 grams of a silver-containing precipitate. The silver yield amounted to 99%.

The filtrate consisting of the laden solution was subsequently passed through activated carbon filters in which gold was recovered in a known manner by an adsorption on activated carbon. A portion of the copper is also adsorbed on the activated carbon and will decrease as more gold is adsorbed on the carbon. About 10% of the copper value and more than 95% of the gold value of the solution supplied to the activated carbon column were adsorbed on the activated carbon.

The laden solution, which was virtually free of noble metal, was subsequently fed by a pump under superatmospheric pressure to a plant consisting of a first in-line mixer, a succeeding filter having a prefiltering layer of diatomaceous earth, and a second in-line mixer succeeding the filter.

4 g NaHS in the form of a 20% solution, under a pressure of 2 bars, were supplied to the first in-line mixer adjacent to its inlet for the laden solution. Adjacent to the outlet for the laden solution, the first in-line mixer was supplied with 15 grams of concentrated sulfuric acid under superatmospheric pressure to adjust the pH value to 1.8. The immediately precipitating copper sulfide was separated in the succeeding filter under superatmospheric pressure and the filtrate was supplied to the succeeding second in-line mixer. In the second in-line mixer, 150 ml milk of lime (as a 20% suspension) was added to the filtrate, which contained free hydrocyanic acid, so that a pH value of 10.5 was obtained. Small quantities of calcium sulfate were separated from the soluble calcium cyanide thus formed. The calcium cyanide was then put to further use.

The filter cakes obtained by the filtration of the metal sulfides contained 10 grams diatomaceous earth and 4.2 grams of a copper-containing precipitate, which contained 74% Cu, 20% S and small amounts of noble metals. The filtrate separated from the precipitated metal sulfides had a pH value of 10.5 and contained 62.4 mg/l Cu, about 0.01 mg/l Au, about 0.01 mg/l Ag and 11.5 g/l CN. The filtrate amounted to 0.5 l.

In the entire process, almost 100% of the metals Cu, Ag and Au are recovered from the laden solution. 90.4% of the cyanogen added as a leaching reagent was recovered as calcium cyanide.

It will be understood that the specification and examples are illustrative but not limitative of the present invention and that other embodiments within the spirit and scope of the invention will suggest themselves to those skilled in the art.

We claim:

1. A process for recovering copper from sulfide- and oxide-containing ores, concentrates, residual waste products and slags in particulate form which contains copper, comprising treating the particulate with an aqueous solution of an alkali cyanide or alkaline earth cyanide to produce a cyanide laden solution; adding a water-soluble sulfide compound to the laden solution; adjusting the solution pH to 1.5 to 2.0 by an addition of acid to effect precipitation of metal sulfide under superatmospheric pressure; filtering off under superatmospheric pressure the precipitated metal sulfide to produce a filtrate containing hydrocyanic acid; and recovering the hydrocyanic acid under superatmospheric pressure by reaction of said filtrate with an alkaline substance; the said superatmospheric pressure in said steps being 1.5 to 15 bars at ambient (room) temperature.

2. The process of claim 1 wherein silver and gold are also present in said particulate and are recovered.

3. The process according to claim 2, wherein the cyanide laden solution is filtered prior to the addition of the water soluble sulfide.

4. The process of claim 1, wherein an alkali sulfide or alkali hydrogen sulfide, preferably sodium sulfide or sodium hydrogen sulfide, is the water-soluble sulfide to effect the precipitation of the metal sulfide.

5. The process of claim 1, wherein the filtrate contains free hydrocyanic acid and is reacted with oxides, hydroxides or carbonates of alkali metals or alkaline earth metals to produce a corresponding alkali metal cyanide or alkaline earth metal cyanide which is recycled to a leaching stage.

6. The process of claim 5, wherein the precipitation of the metal sulfides and the reaction of the hydrocyanic acid with oxides, hydroxides or carbonates of alkali metals or alkaline earth metals are carried out in respective first and second in-line mixers.

7. The process of claim 6, wherein the silver and gold contained in the clarified copper cyanide solution are removed from said solution by adsorption on activated carbon and copper cyanide solution is supplied to the precipitating stage, whereafter the copper sulfide is filtered off and the hydrocyanic acid is recovered.

8. The process of claim 7, wherein the silver contained in the clarified copper cyanide solution which contains silver and gold is precipitated as sulfide under alkaline conditions and the precipitate is separated, the gold is removed from the filtrate by an adsorption on activated carbon, copper sulfide is precipitated out of the copper cyanide solution under acid conditions and is separated, and the hydrocyanic acid contained in the filtrate is recovered by reaction with an alkaline substance.

* * * * *